(12) United States Patent
Rickerson

(10) Patent No.: US 10,711,474 B1
(45) Date of Patent: Jul. 14, 2020

(54) POOL PUMPING APPARATUS

(71) Applicant: Russel Rickerson, Rantoul, KS (US)

(72) Inventor: Russel Rickerson, Rantoul, KS (US)

( * ) Notice: Subject to any disclaimer, the term of this patent is extended or adjusted under 35 U.S.C. 154(b) by 0 days.

(21) Appl. No.: 16/785,177

(22) Filed: Feb. 7, 2020

(51) Int. Cl.
*E04H 4/12* (2006.01)
*G01F 23/60* (2006.01)
*F04D 13/08* (2006.01)

(52) U.S. Cl.
CPC .............. *E04H 4/12* (2013.01); *G01F 23/60* (2013.01); *F04D 13/086* (2013.01)

(58) Field of Classification Search
CPC ........................................................ E04H 4/12
USPC ................................................ 4/508; 482/55
See application file for complete search history.

(56) References Cited

U.S. PATENT DOCUMENTS

| | | | | |
|---|---|---|---|---|
| 3,805,815 A | * | 4/1974 | Goodin | E04H 4/1681 134/167 R |
| 3,837,015 A | * | 9/1974 | Whitaker | F16K 31/20 4/508 |
| 4,342,125 A | * | 8/1982 | Hodge | E04H 4/12 137/430 |
| 4,655,243 A | * | 4/1987 | Keller | E04H 4/1218 137/403 |
| 5,365,617 A | * | 11/1994 | Tarr | E04H 4/12 137/392 |
| 5,367,723 A | * | 11/1994 | Pleva | E04H 4/12 137/428 |
| 5,459,886 A | * | 10/1995 | Payne | E04H 4/1209 137/414 |
| 5,624,238 A | * | 4/1997 | Herbert | A62C 25/00 417/234 |
| 5,655,232 A | * | 8/1997 | Buckwalter | E04H 4/12 137/403 |
| 5,787,519 A | * | 8/1998 | Smith | E04H 4/0056 4/488 |
| 5,790,991 A | * | 8/1998 | Johnson | E04H 4/12 137/423 |
| 5,954,972 A | * | 9/1999 | Polimeni, Jr. | E04H 4/1263 210/167.2 |
| 7,562,401 B2 | * | 7/2009 | Kim | A63B 69/0093 4/491 |
| 8,091,581 B2 | * | 1/2012 | Buchtel | F16K 31/26 137/434 |
| 2003/0101523 A1 | | 6/2003 | Lepley, Jr. | |

(Continued)

FOREIGN PATENT DOCUMENTS

EP   2 006 546 B1   8/2019

*Primary Examiner* — Lori L Baker
(74) *Attorney, Agent, or Firm* — Dale J. Ream

(57) ABSTRACT

A pool pumping apparatus for maintaining a constant level of water in a swimming pool includes a conduit having a lower end defining an inlet and an outlet that are open, the conduit defining an interior area through which water is channeled between the inlet and outlet. The apparatus includes a pump in fluid communication with the inlet of the conduit, the pump having a motor configured to transfer water from the inlet to the outlet when energized. In addition, a float assembly includes a housing that defines an interior space and includes a float member positioned in the interior space, the float assembly including a cord extending from the float member operable for setting the float member at a selected level. The float member is electrically connected to the pump and configured to energize the pump when the float member is above the selected level.

19 Claims, 5 Drawing Sheets

(56) References Cited

U.S. PATENT DOCUMENTS

| | | |
|---|---|---|
| 2005/0244287 A1 | 11/2005 | Dobrynski |
| 2006/0039800 A1* | 2/2006 | Saunders ................ B63B 13/00 |
| | | 417/234 |
| 2009/0260149 A1* | 10/2009 | Booth ....................... E04H 4/14 |
| | | 4/508 |
| 2011/0247970 A1* | 10/2011 | Evingham ............. E04H 4/1654 |
| | | 210/85 |

* cited by examiner

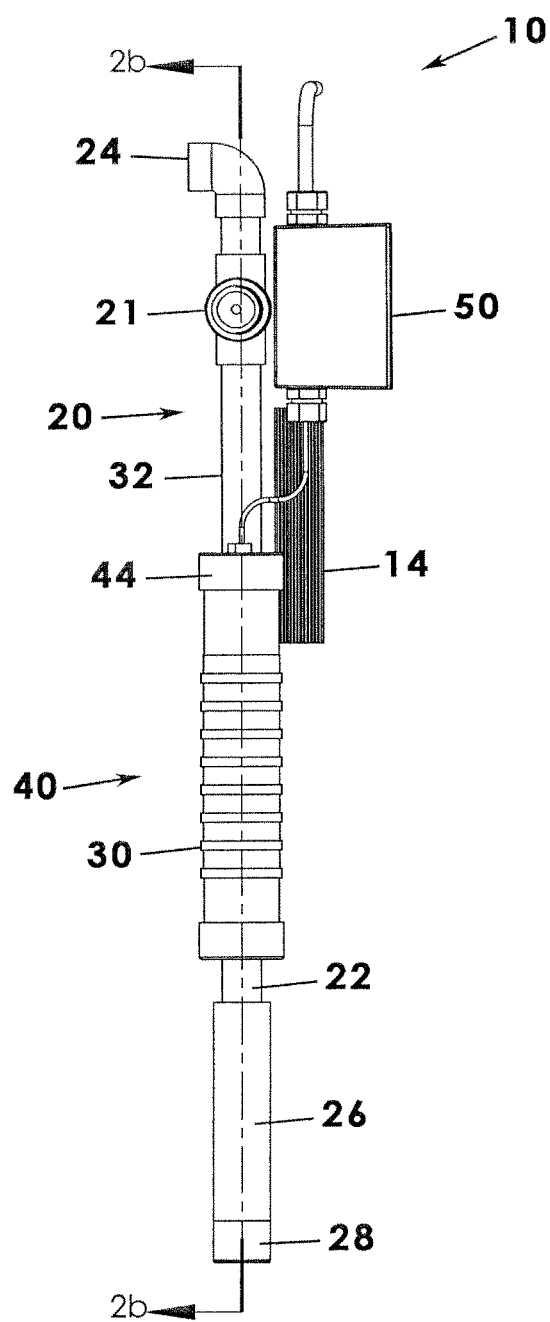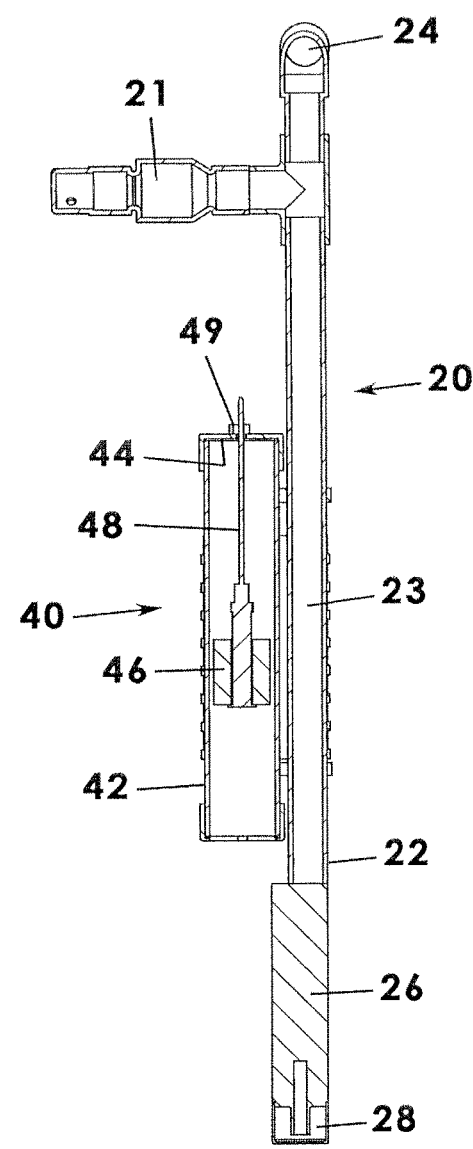
Fig.2a
Fig.2b

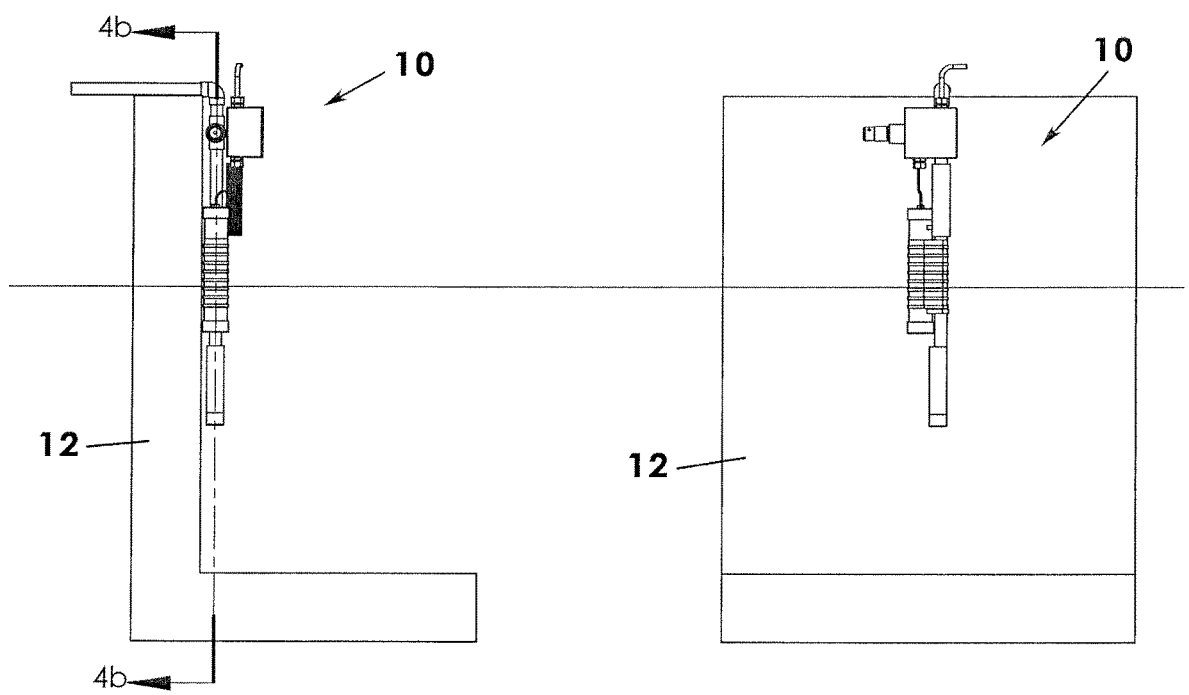

POOL PUMPING APPARATUS

BACKGROUND OF THE INVENTION

This invention relates generally to pumping devices and, more particularly, to a pool pumping apparatus for maintaining a consistent level or depth of water in a swimming pool by pumping water out of the pool onto the ground or into a drain whenever a predetermined overage is detected.

It is important to leave a certain level of water in a residential swimming pool over the course of a winter. Leaving a pool completely drained may lead to damage to vinyl or concrete surfaces. In other words, leaving an amount of water in the pool can help protect its surfaces—not to mention keeping an above ground pool heavy enough to be grounded against winter winds. However, it is equally important not to allow water to enter the skimmer or other pool hardware that could be ruined if that water was to freeze. In short, the level of water in a pool should be monitored over the course of the winter and the level reduced if it has naturally increased to a level that could damage pool components if it were to freeze. The water level in a pool may actually increase as ice and snow fall into a pool or fall on a cover that then puts pressure on the water under it. In other words, the excess water may need to be pumped out and away from the pool.

Various devices have been proposed or are commonly known for pumping water. Although presumably effective for their intended purposes, there is still a need for a pool pumping apparatus that may simply be hung and submersed in a swimming pool and that pumps excess water out of the pool whenever an overage is detected.

Therefore, it would be desirable to have a pool pumping apparatus that automatically pumps water out of a swimming pool and onto the ground whenever that water level is detected to have increased over a predetermined or selected level. Further, it would be desirable to have a pool pumping apparatus that is selectively heated so as to work even in freezing temperatures.

SUMMARY OF THE INVENTION

A pool pumping apparatus for maintaining a constant level of water in a swimming pool according to the present invention includes a conduit having a lower end defining an inlet that is open and an upper end defining an outlet that is open, the conduit defining an interior area through which water is channeled between the inlet and the outlet. The apparatus includes a pump in fluid communication with the inlet of the conduit, the pump having a motor configured to transfer water from the inlet to the outlet when energized. In addition, a float assembly includes a housing that defines an interior space and includes a float member positioned in the interior space, the float assembly including a cord extending from the float member operable for setting the float member at a selected level. The float member is electrically connected to the pump and configured to energize the pump when the float member is above the selected level.

Therefore, a general object of this invention is to provide a pool pumping apparatus that is configured to maintain a consistent level of water in a swimming pool by pumping out excess water as it is detected.

Another object of this invention is to provide a pool pumping apparatus, as aforesaid, having a float assembly with a float member configured to actuate a water pumping device when the float is raised above a predetermined level.

Still another object of this invention is to provide a pool pumping apparatus, as aforesaid, having a vacuum breaker for preventing undesirable backflow and siphon effects when water from the swimming pool is pumped through the conduit.

Yet another object of this invention is to provide a pool pumping apparatus, as aforesaid, that is submersible in water.

A further object of this invention is to provide a pool pumping apparatus, as aforesaid, having heat tape that surrounds the float assembly and emits heat when the temperature air is less than a freezing temperature, e.g. 32 degrees Fahrenheit.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2a is a front view of the pool pumping apparatus as in FIG. 1:

FIG. 2b is a sectional view of the pool pumping apparatus taken along line 2b-2b of FIG. 2a;

FIG. 4a is a side view of the pool pumping apparatus as in FIG. 3 in use on a swimming pool;

FIG. 4b is a sectional view taken along line 4b-4b of FIG. 4a; and

FIG. 4c is a front view of the pool pumping apparatus as in FIG. 4a.

DESCRIPTION OF THE PREFERRED EMBODIMENT

Figure 1:
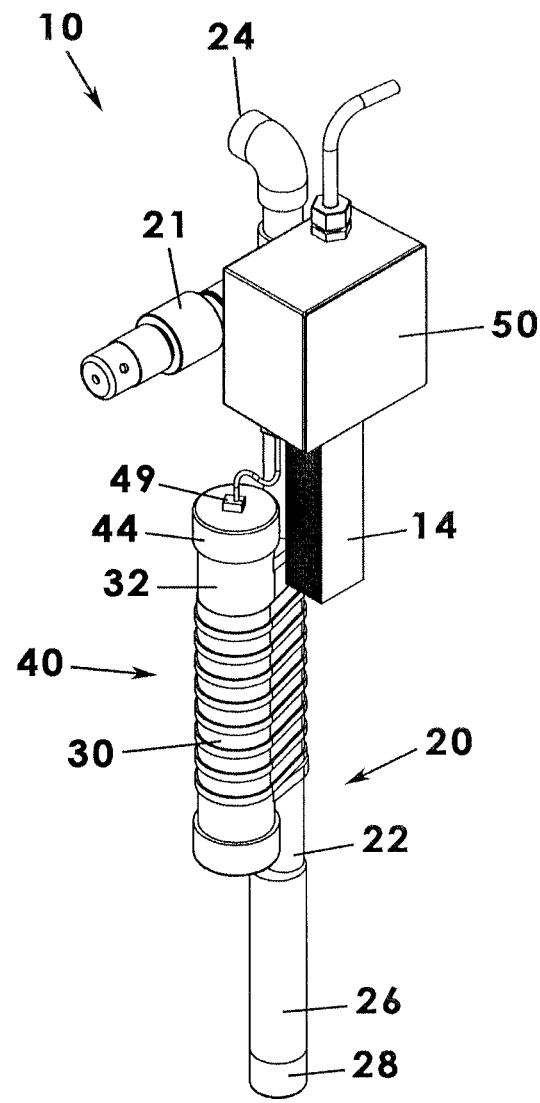
FIG. 1 is a perspective view of a pool pumping apparatus according to a preferred embodiment of the present invention.
Figure 3:
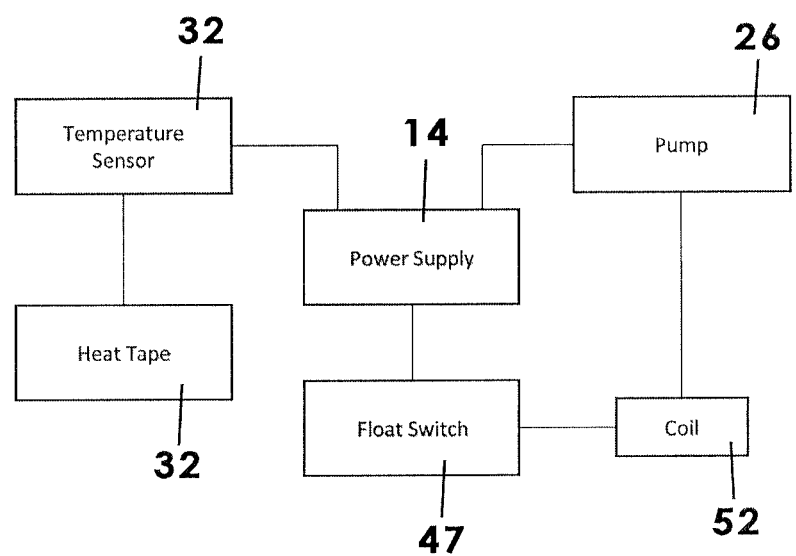
FIG. 3 is a block diagram of the pool pumping apparatus illustrating the electric and electronic components of the present invention.

A pool pumping apparatus according to a preferred embodiment of the present invention will now be described with reference to FIG. 1 to 4c of the accompanying drawings. The pool pumping apparatus 10 includes a conduit 20, a pump 26, and a float assembly 40 that, together, maintain a constant and predetermined level of water in a swimming pool 12.

The pool pumping apparatus 10 includes a conduit 20 having a generally linear configuration defining a longitudinal axis. It is understood that the conduit 20 may sometimes be referred to as a channel as water from the swimming pool 12 will be channeled through the conduit 20 as explained below. The conduit 20 may be a pipe constructed of metal or plastic and, preferably, has a cylindrical configuration defining an interior area. The conduit 20 has an inlet 22 at an open proximal end and has an outlet 24 at an open distal end, the proximal and distal ends being opposite one another. Water (or referred to as a water stream) enters the inlet 22 at the proximal end and is directed through the interior area and then out through the outlet 24 when the pump 26 is energized as will be described below.

The pool pumping apparatus 10 includes a motorized pump 26 in fluid communication with the inlet 22 of the conduit 20. More particularly, the pump 26 may be coupled to the proximal end of the conduit 20, the pump 26 being waterproof and submersible into the water of a swimming pool 12. Preferably, the pump 26 is inline with the longitudinal axis of the conduit. In an embodiment, a filter 28 may be positioned at the terminal end of the pump 26 for removing impurities from the water sucked from the swimming pool 12 water as the pump 26 operates. Preferably, the pump 26 is operably and electrically connected to a power supply 14, the power supply 14 being coupled to or adjacent to the conduit 20. The power supply 14 may be a battery which may be rechargeable upon electrical connection to an AC electrical source, e.g. via wires and plug. Therefore, when the pump 26 is energized, water is drawn into the conduit 20 via the inlet 22 and is directed through the interior area 23 thereof and then out through the outlet 24. How the pump 26 is energized will be described later.

In another aspect, it is important that the water stream directed through the conduit avoid the negative results than could occur if a vacuum occurs—potentially causing smooth fluid flow to become seized up or for backflow to occur. For instance, operation of the pump 26 may cause low pressure adjacent the inlet 22 (at the proximal end) which may encourage back flow of water from the outlet 24 (distal end) to return toward the inlet 22 end. To avoid this occurrence, a backflow prevention device in the form of a vacuum breaker device 21 may be positioned adjacent the distal end, i.e. near the outlet 24 (FIG. 2b). Pressure differential that may lead to a suction, vacuum, or a backflow condition may be vented to the ambient air by the vacuum breaker device 21 as needed to keep the water flow moving efficiently.

Figure 4B:
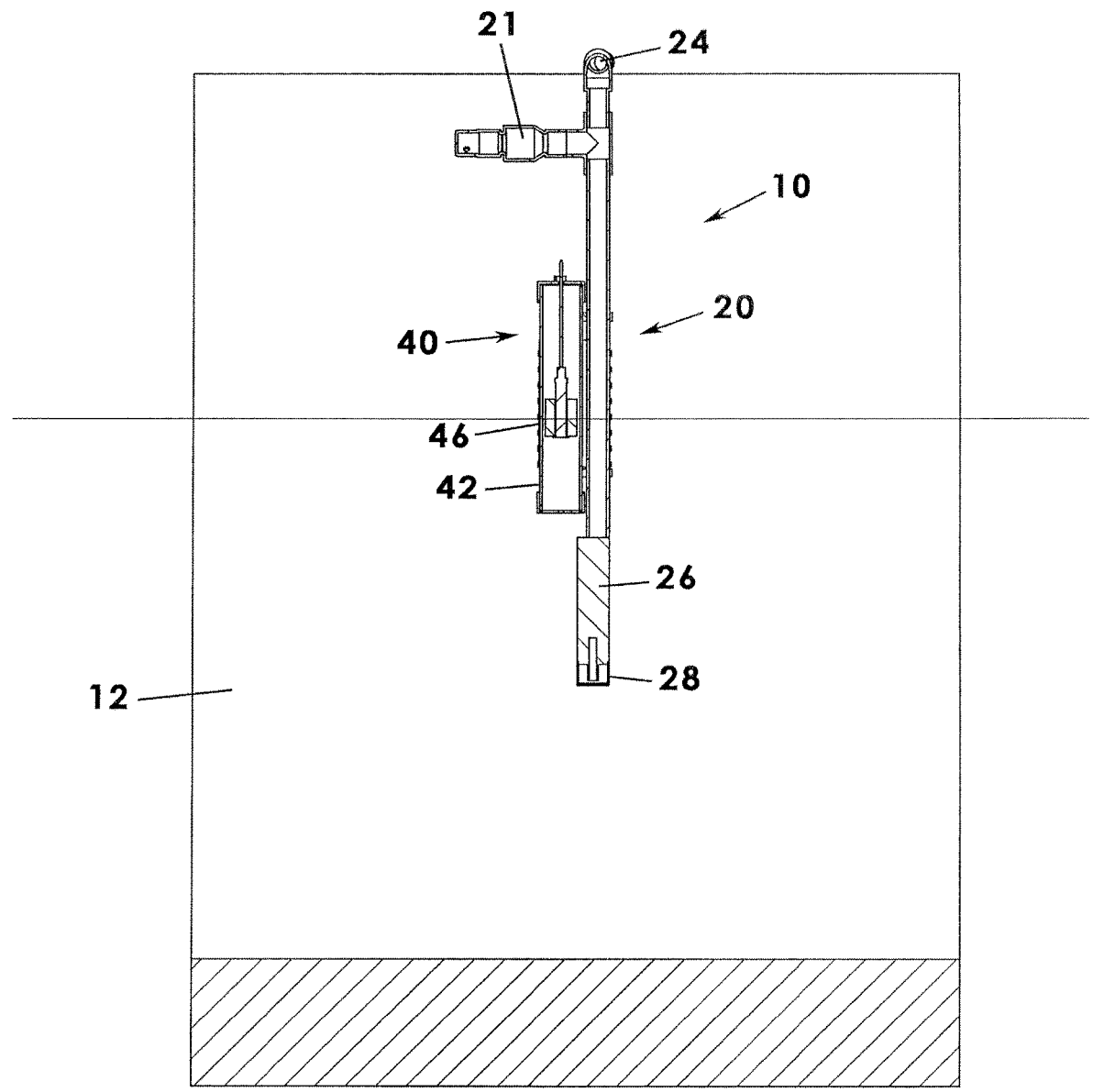

In another aspect, the outlet 24 itself may be configured as a flange configured to hang the pool pumping apparatus 10 from a wall of the swimming pool (FIG. 4). More particularly, the outlet 24 may be oriented 90 degrees or perpendicular relative to the longitudinal axis defined by the conduit 20 and may have a length sufficient to hang from a wall of the swimming pool 12. It is understood that the outlet 24 may include piping having an elongate configuration such that water from the swimming pool may be output onto the ground, sidewalk, or into a drain adjacent the swimming pool 12.

Now, attention will be given to how and when the pump 26 is actuated to suck water from the swimming pool 12 and through the conduit 20. Namely, the pool pumping apparatus 10 includes a float assembly 40 having a housing 42 coupled to or positioned adjacent the conduit 20. The housing 42 defines an interior space and may have a cap or lid 44 threadably or frictionally attached atop the housing 42 by which the interior space thereof may be accessed. Further, the float assembly 40 includes a float member 46 positioned in the interior space of the housing 42. A cord 48 is coupled to and extends away from the float member 46 and extends outwardly through the lid 44. The cord 48 may also be referred to as a tether as it suspends the float member 46 from the lid 44. The position or depth of the float member 46 is adjusted by the position of a fastener such as a clip 49 attached to the cord 48. Stated another way, the fastener may be attached to the cord 48 atop the lid 44 such that the float member 46 is suspended to a selected position or depth inside the housing 42. It is understood that the cord 48 is an electrical wire configured to carry an electrical signal as will be described below. The float member 46 includes a magnetic switch 47 that is configured and operable to detect when the float is raised by rising water in which it is floating. In other words, a water level of the swimming pool 12 is monitored by the float member 46 and the float member 46 switches on (i.e. closes a circuit) when the water level rises to a selected and predetermined level. Even more specifically, the float assembly 40 includes a coil 52 situated in the electronics box 50 and is electronically connected to the switch 47 of the float member 46. When the switch 47 is actuated, the switch 47 actuates the coil 52 via electrical current sent through the cord 48.

The float member 46 is electrically connected to the power supply 14 such as with a wire. Similarly, the coil within the electronics box 50 may be electrically connected to the power supply 14. Still further, the float assembly 40 is electrically connected to the pump 26 directly or indirectly being coupled to the power supply 14 via wires or wirelessly as will be understood by one of ordinary skill in the art.

In still another aspect, the housing 42 of the float assembly 40 is operational despite the ambient air temperature or water temperature. In other words, the housing 42 containing the float member 46 is configured to maintain a temperature that is heated above a freezing temperature. More particularly, a length of heat tape 30 is wrapped about the housing 42 and is electrically connected to temperature sensor 32 and configured to be activated if the temperature sensor 32 detects a temperature of 32 degrees Fahrenheit or below. In an embodiment, the temperature sensor 32 may be coupled to an outer surface of the housing 42.

In use, the pool pumping apparatus 10 may be coupled to a wall of a swimming pool 12 and substantially submersed in the water thereof. The float assembly 40 may the manipulated by adjusting the cord 48 so as to hang or suspend the float member 46 to a desired depth within the housing 42 as described above. Then, it can be expected that the pump 26 will be energized each time the float member 46 is detected as having been raised by rising water within the pool 12 so as to remove water from the pool 12 to maintain a consistent water level.

It is understood that while certain forms of this invention have been illustrated and described, it is not limited thereto except insofar as such limitations are included in the following claims and allowable functional equivalents thereof.

The invention claimed is:

1. A pool pumping apparatus for maintaining a constant level of water in a swimming pool, said pool pumping apparatus, comprising:
   a conduit having a lower end defining an inlet that is open and an upper end defining an outlet that is open, said conduit defining an interior area through which water is channeled between said inlet and said outlet;
   a pump in fluid communication with said inlet of said conduit, said pump having a motor configured to transfer water from said inlet to said outlet when energized; and
   a float assembly having a housing positioned proximate the conduit that defines an interior space and having a float member positioned in said interior space, said float assembly including a cord extending from said float member operable for setting said float member at a selected level;
   wherein said float member is electrically connected to said pump and configured to energize said pump when said float member is above said selected level.

2. The pool pumping apparatus as in claim 1, wherein:
   said float assembly includes a coil situated in an inside area defined by an electronics box adjacent said conduit and said float assembly, said coil being electrically connected to a power source and to said pump for energizing said pump when actuated;
   said cord of said float assembly includes an electrical wire electrically connected to said coil and configured to energize said coil when said float member is raised above said selected level.

3. The pool pumping apparatus as in claim 2, wherein said float member of said float assembly includes a magnetic switch that detects when said float member is raised above said selected level.

4. The pool pumping apparatus as in claim 3, further comprising:
   a temperature sensor proximate said float assembly that is configured to determine an ambient air temperature; and
   a heat tape member mounted to said housing of said float assembly and in data communication with said temperature sensor, said heat tape member configured to activate and emit heat when said temperature sensor determines the ambient air temperature is below a predetermined temperature.

5. The pool pumping apparatus as in claim 1, further comprising a vacuum breaking member coupled to said conduit and in fluid communication with the water flowing through the interior area thereof, said vacuum breaking member being configured to prevent a siphon effect of the water flowing between said inlet and said outlet.

6. The pool pumping apparatus as in claim 5, wherein said vacuum breaking member is a backflow prevention device configured to counteract backflow resulting from low pressure caused by operation of said pump.

7. The pool pumping apparatus as in claim 6, wherein said vacuum breaking device is positioned proximate said outlet.

8. The pool pumping apparatus as in claim 5, further comprising a filter positioned upstream of said pump and in fluid communication with said interior area of said conduit, said filter being configured to remove impurities from the water flowing along said interior area of said conduit.

9. The pool pumping apparatus as in claim 2, wherein:
   said power source is a submersible battery; and
   said pump is a submersible pump.

10. The pool pumping apparatus as in claim 2, wherein said outlet includes a flange that is perpendicular to an imaginary longitudinal axis defined by said conduit, said flange being configured to hang and orient the conduit to a wall of the swimming pool.

11. A pool pumping apparatus for maintaining a constant level of water in a swimming pool, said pool pumping apparatus, comprising:
   a channel having an inlet that is open and an outlet that is open, said channel defining an interior area through which a water stream from the swimming pool is directed between said inlet and said outlet;
   a pump in fluid communication with said inlet of said channel, said pump having a motor configured to transmit the water stream in a downstream direction from said inlet to said outlet when energized; and
   a float assembly positioned proximate the conduit and having a float member positioned inside a housing and having a cord extending from said float member that is operable for setting said float member at a selected level, said float member being electrically connected to said pump and configured to energize said pump when said float member is detected above said selected level;
   a temperature sensor proximate said float assembly that is configured to determine an ambient air temperature; and
   a heat tape member mounted to said housing of said float assembly and in data communication with said temperature sensor, said heat tape member configured to activate and emit heat when said temperature sensor determines the ambient air temperature is below a predetermined temperature.

12. The pool pumping apparatus as in claim 11, wherein said outlet includes a flange that is perpendicular to an imaginary longitudinal axis defined by said channel, said flange being configured to attach and orient the channel to a wall of the swimming pool.

13. The pool pumping apparatus as in claim 11, wherein:
   said float assembly includes a coil situated in an inside area defined by an electronics box adjacent said conduit and said float assembly, said coil being electrically connected to a power source and to said pump for energizing said pump when actuated;
   said cord of said float assembly is an electrical wire electrically connected to said coil and configured to energize said coil when said float member is raised above the selected level.

14. The pool pumping apparatus as in claim 13 wherein said float member of said float assembly includes a magnetic switch that detects when said float member is raised above said selected level.

15. The pool pumping apparatus as in claim 11, further comprising a vacuum breaking member coupled to said channel and in fluid communication with the water flowing through the interior area thereof, said vacuum breaking member being configured to prevent a siphon effect of the water flowing between said inlet and said outlet.

16. The pool pumping apparatus as in claim 15, wherein said vacuum breaking member is a backflow prevention device configured to counteract backflow resulting from low pressure caused by operation of said pump.

17. The pool pumping apparatus as in claim 16, wherein said vacuum breaking device is positioned proximate said outlet.

18. The pool pumping apparatus as in claim 11, further comprising a filter positioned upstream of said pump and in fluid communication with said interior area of said channel, said filter being configured to remove impurities from the water flowing along said interior area of said channel.

19. The pool pumping apparatus as in claim 13, wherein:
   said power source is a submersible battery; and
   said pump is a submersible pump.

\* \* \* \* \*